United States Patent [19]

Belanger

[11] 4,096,600
[45] Jun. 27, 1978

[54] FRICTION CURTAIN APPARATUS

[76] Inventor: James A. Belanger, 370 S. Rogers, Northville, Mich. 48167

[21] Appl. No.: 776,791

[22] Filed: Mar. 11, 1977

[51] Int. Cl.² ............................................. B60S 3/04
[52] U.S. Cl. ..................................... 15/97 B; 51/337
[58] Field of Search ......................... 15/DIG. 2, 97 B; 51/334, 337

[56] References Cited

U.S. PATENT DOCUMENTS

| | | | |
|---|---|---|---|
| 3,747,285 | 7/1973 | Block | 51/334 X |
| 3,859,686 | 1/1975 | Breish | 15/97 B |
| 3,879,903 | 4/1975 | Belanger | 51/337 |

*Primary Examiner*—Edward L. Roberts
*Attorney, Agent, or Firm*—Cullen, Settle, Sloman & Cantor

[57] ABSTRACT

The friction curtain apparatus is for washing a motor vehicle which is moved through an opening in the frame of the apparatus having a longitudinally extending axis between the opening's entrance and exit. A least a pair of swingable scrubbing units are pivotally carried by the frame on each side of the axis and are capable of turning or swinging in alternate directions forward and then backward with respect to the entrance and exit. Each of the units comprises an elongated rack having a plurality of transversely extending slot-defining apertures which are parallel to one another. A pack unit containing fill material is received in each of the apertures and forms a curtain. The racks of each pair of units are connected by tie bars which are pivotally connected to upstanding arms carried at opposite ends of the racks. Power actuated means are provided for swinging the racks and the curtains carried thereby through an arcuate path forward and then backward and imparting to the curtains a sweeping scrubbing and flicking motion to permit the curtains to contact the exterior portions of the vehicle to clean or to finish same. The power actuated means includes mechanism for coordinating the swinging of the racks and curtains of each pair of units in a selected phase relationship resulting in that the racks and curtains at one side of the axis are pivotally turned out of phase with the racks and curtains on the other side of the axis.

13 Claims, 5 Drawing Figures

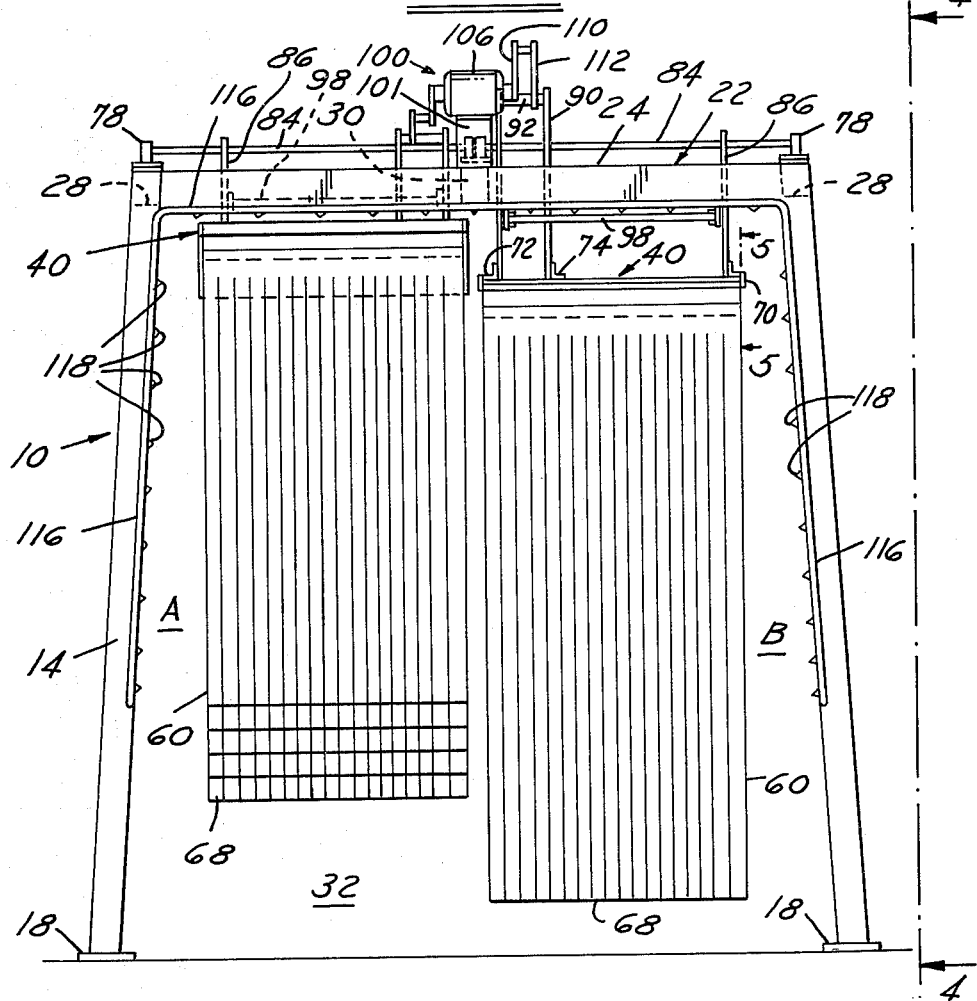
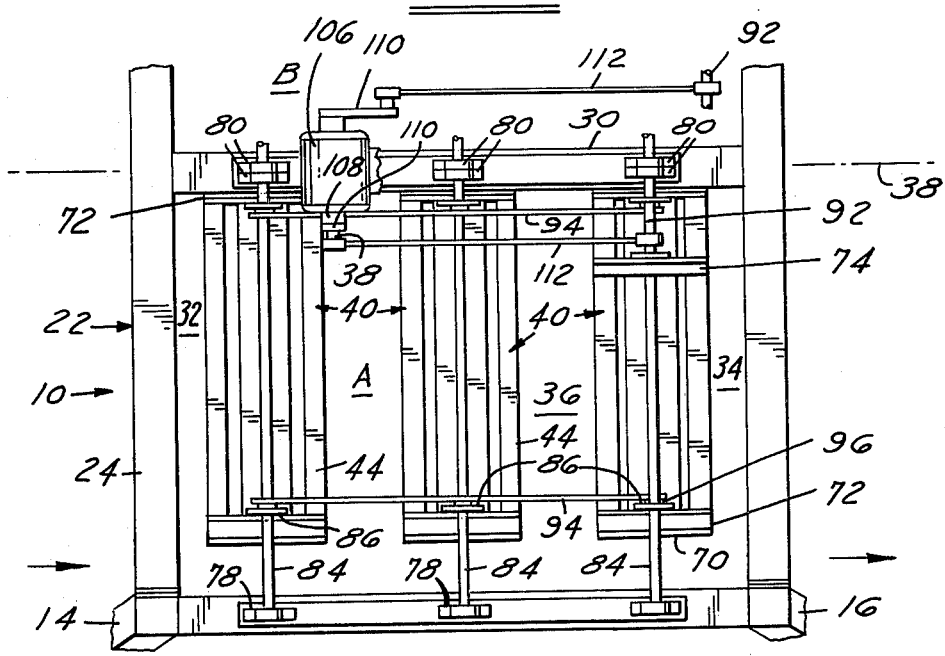

FRICTION CURTAIN APPARATUS

BACKGROUND OF THE INVENTION

This invention relates to a car washing apparatus for thoroughly cleaning the exterior surfaces of a vehicle by means of a plurality of flexible curtains which are oscillated along the direction of movement of the vehicle through the apparatus for cleaning the vehicle.

A car washing apparatus of this general character is disclosed in the Breish U.S. Pat. No. 3,859,686 entitled "Scrubbing Apparatus For Vehicles," dated Jan. 14, 1975. This invention constitutes an improvement over the Breish U.S. Pat. No. 3,859,686 as well as over the other patents cited or referred to (Column 1, lines 12-15) therein.

U.S. Pat. No. 3,859,686 discloses an apparatus having a plurality of sections each comprising a multiplicity of curtain-like scrubbing elements. The sections extend across the vehicle and are supported and oscillated through a dual operating system of levers and linkage in a way that materially divides and balances the scrubbing forces so as to reduce substantially the effect of impact energy in imparting undesirable side or longitudinal motion to a vehicle being cleaned yet utilizing such energy for scrubbing purposes. The prior art arrangement is such that during a substantial part of the operating cycle one section of curtains moves in one direction longitudinally of the vehicle while a second section moves in the opposite direction. The two sections oscillate about 90° to 180° out of phase resulting in a balancing of the inertia and friction scrubbing forces encountered during the operation of the apparatus.

SUMMARY OF THE PRESENT INVENTION

It is a feature of the present invention to provide a friction curtain apparatus that uniformly and efficiently scrubs or cleans the exterior surfaces of a vehicle being washed without damaging the vehicle.

A further feature of the present invention is to provide a friction curtain apparatus for washing a motor vehicle which is moved through an opening in the frame of the apparatus having a longitudinally extending axis between the opening's entrance and exit. At least a pair of swingable scrubbing units are pivotally carried by the frame on each side of the axis and are capable of turning or swinging in alternate directions forward and then backward with respect to the entrance and exit. Each of the units comprises an elongated rack having a plurality of transversely extending slot-defining apertures which are parallel to one another. A pack unit containing fill material is received in each of the apertures and forms a curtain.

A still further feature of the present invention is to provide an apparatus of the aforementioned type wherein the racks of each pair of units are connected by tie bars which are pivotally connected to upstanding arms carried at opposite ends of the racks. Power actuated means are provided for swinging the racks and the curtains carried thereby through an arcuate path forward and then backward and imparting to the curtains a sweeping scrubbing and flicking motion to permit the curtains to contact the exterior surfaces of the vehicle to clean or to finish same. The power actuated means includes mechanism for coordinating the swinging of the racks and curtains of each pair of units in a selected phase relationship resulting in that the racks and curtains at one side of the axis are pivotally turned out of phase with the racks and curtains on the other side of the axis.

Another feature of the present invention is to provide three swingable scrubbing units at each side of the axis which are pivotally carried by the frame, with the three units at each side of the axis being pivotally connected by a pair of tie bars to permit the racks to swing in unison forward and then backward, resulting in a sweeping scrubbing and flicking motion being imparted to the curtains.

Still another feature of the present invention is to provide an apparatus of the aforementioned type wherein each rack has a pair of upstanding rigid pivot arms connected on the lower ends thereof to opposite end portions of the rack, with the upper end portions of the arms of each rack having openings for receiving a rod which is pivotally carried by said frame and about which the unit pivots. With such a construction the tie bars are pivotally secured to arms on the racks to permit same to swing in unison.

A further feature of the present invention is to provide power actuated means which includes a drive shaft, crank arms mounted on the ends of the drive shaft, and a pair of connecting rods, one rod for each pair or set of swingable scrubbing units at each side of the axis. With such a construction the rods are each secured on one end to one of the crank arms and on the other end to one of the arms of a rack of a set of scrubbing units for swinging the units.

Another feature of the present invention is to provide a power operated friction curtain wash apparatus which is simple in construction, contains fewer parts than prior art devices, is efficient in operation and is easy to maintain.

BRIEF DESCRIPTION OF THE DRAWINGS

FIG. 2 is a front elevation of the apparatus;

FIG. 3 is a plan view of the apparatus taken on line 3—3 of FIG. 4;

DESCRIPTION OF THE PREFERRED EMBODIMENT

Figure 1:
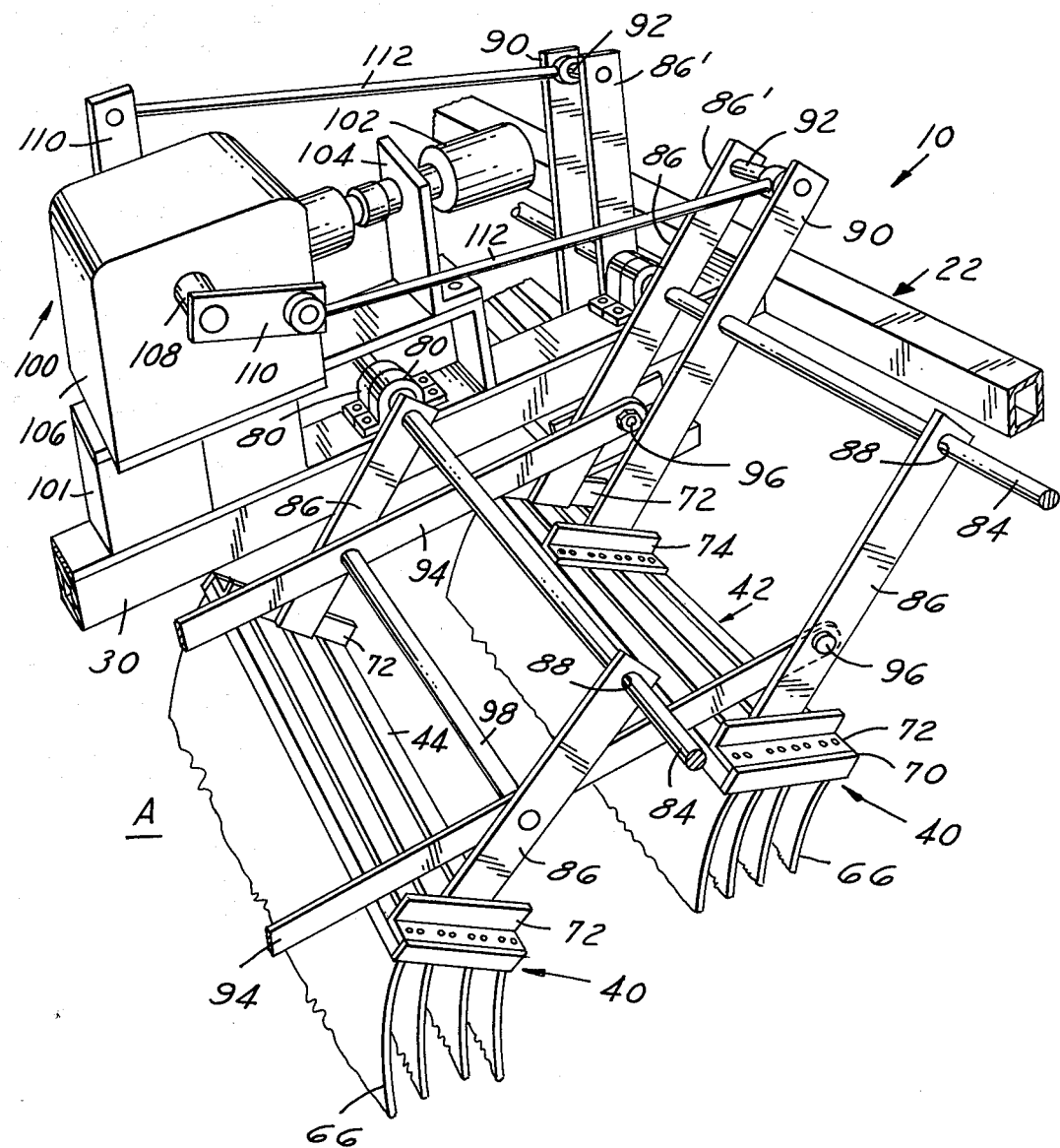
FIG. 1 is a fragmentary perspective view of the friction curtain apparatus of the present invention.

The drawings illustrate a friction wash curtain or scrubbing apparatus 10 which includes a frame 12 including a pair of vertically disposed front legs 14 and a pair of vertically disposed back legs 16. The legs 14, 16 are spaced apart and form the corners of the frame 12. The front legs 14 are each provided with a base or foot 18, while the back legs 16 are each provided with a base or foot 20. The legs 14, 16 are of tubular or box-like construction and each leg may be made with telescoping sections to permit the lengths or heights thereof to be vertically adjusted.

The frame 12 includes an elevated superstructure or bridge 22 at the upper ends of the legs 14, 16. The superstructure 22 provides a support for the swingable scrubbing units to be subsequently described. The superstructure 22 comprises horizontally arranged structural members of tubular or box-like construction including a front member 24, a back member 26 arranged parallel to member 24, and first and second side members 28 which connect opposite ends of the front and back members 24, 26 and are bolted, welded or otherwise secured thereto. The superstructure 22 further includes an intermediate horizontal member 30 arranged parallel to side members 28 and having its ends secured to the front and back members 24, 26 near the midpoints thereof to divide the superstructure 22 into bays A and B, each of which is provided with a plurality of scrubbing units as will subsequently appear.

The frame 12 including the superstructure 22 is in the form of an arch and includes an entrance 32 and an exit 34. An opening 36 is defined by the frame 12 between the entrance 32 and exit 34 with the opening 36 having a longitudinally extending axis 38 generally beneath the intermediate member 30 of the superstructure 22. The working height of the frame 22 is, as an example, 11 feet to accommodate motor vehicles including vans and cars. Such height may be adjusted where space is limited.

Figure 4:
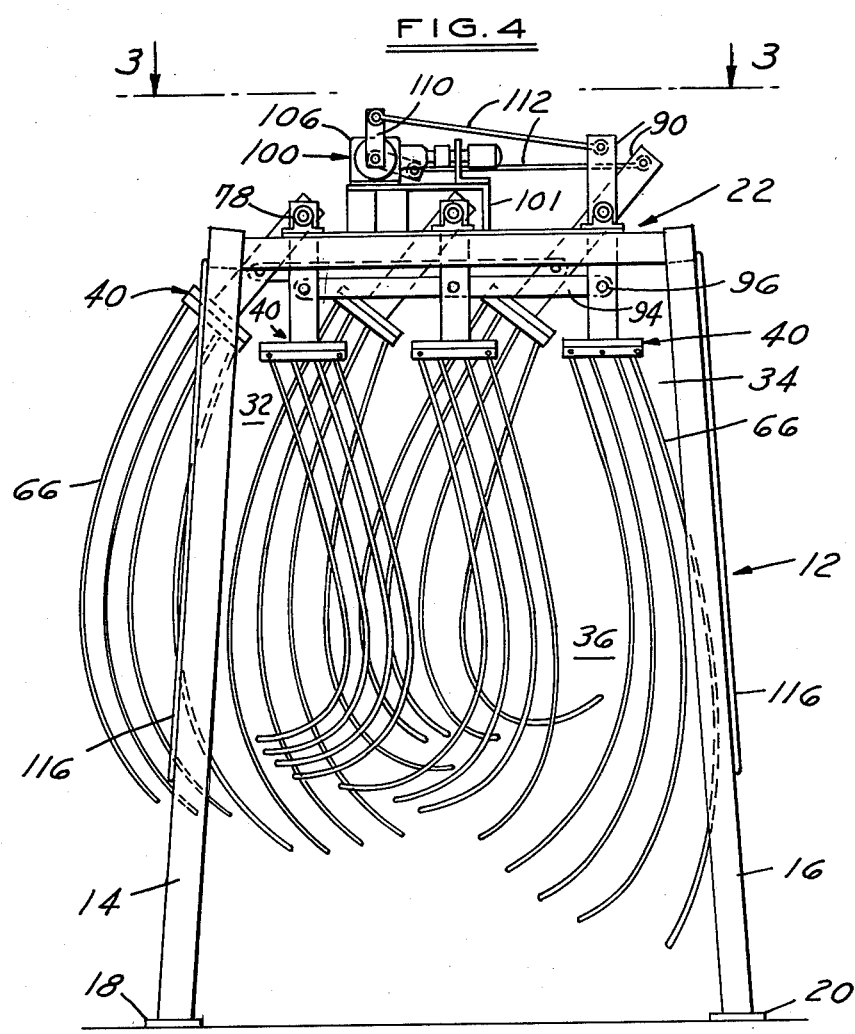
FIG. 4 is a side elevation of the apparatus.

Each bay A and B is located on one or the other side of the longitudinally extending axis 38 (FIG. 3) and includes a set of swingable scrubbing units 40, with each set including two or more units 40. The units 40 extend into the frame opening 36. In the preferred embodiment each set includes three scrubbing units 40 as shown in FIG. 4. Each unit 40 is of generally identical or similar construction.

Each unit 40 includes a rack 42 having an elongated base 44 of generally rectangular configuration. Secured to the bottom surface of the base 44 are a plurality of elongated longitudinally aligned slot-defining structures 46 (FIG. 5) each of which is adapted to removably mount a pack unit 48 of finishing material as disclosed and described in greater detail in my copending U.S. Patent Application, Ser. No. 680,838 filed on Apr. 28, 1976, now U.S. Pat. No. 4,055,028, which is incorporated herein by reference.

Ths slot-defining structures 46 may be made from heavy duty, extruded, tempered aluminum or the like, which replaceably and pivotally mount the pack units 48 so that they are suspended to form friction curtains in the opening 36. The structures 46 are secured to the rack 42 by welding, threaded bolt assemblies, or any similar, conventionally known fastening means.

Figure 5:
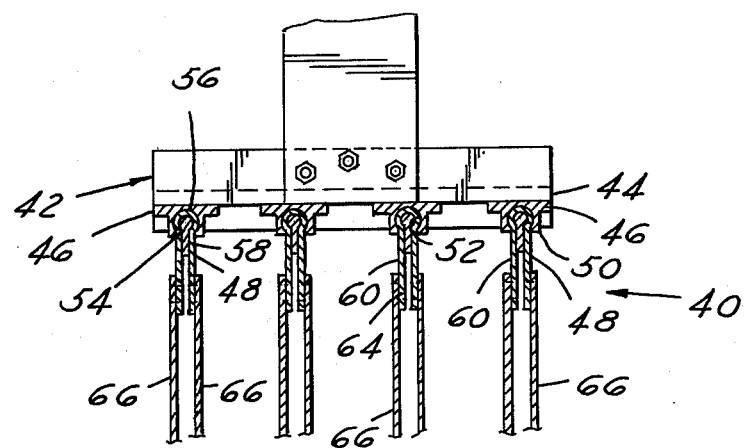
FIG. 5 is a fragmentary view, partly in section, taken on the line 5—5 of FIG. 2.

Each of the structures 46 includes a slot-defining formation 50 thereon for defining a quasi-cylindrical, key-hole-type slot 52 which is disposed perpendicular to the longitudinally extending axis 38 (FIG. 3). The elongated slot 52 has a generally cylindrical inner portion which opens radially downwardly through a restricted neck portion as shown in FIG. 5.

The pack unit 48 has a length about equal to the length of the slot 52 and rack 42 and includes a substantially solid, elongated, head-forming and pack-reinforcing support element 54 which is in the form of an integrally extruded piece of resiliently firm yet flexible material such as a thermoplastic or thermosetting plastic material such as polyurethane. The support element 54 has a generally cylindrical bulb-like portion or bead 56 having a single, substantially flat, integral fin portion or flag 58 extending radially downwardly from bead 56 as shown in FIG. 5.

The pack unit 48 has a mounting end which includes a first sheet or ply 60 of relatively flexible, cloth-like material which is draped or looped tightly over the support element 52 so as to conform closely to the contours thereof. The sheet 60 is stitched or otherwise secured to the support element 52 and together forms the generally cylindrical, material covered bulbous head and neck portion of the pack unit 48 in the slot 52.

Various rows of stitches, staples or other fastening means are used to connect the support element 52 and sheet 60 together. The sheet 60 has its opposite end portions 62 and 64 spaced apart. Connected to the end portions 62 and 64 by stitches are flap-like units 66 which form the friction curtains. The curtains 66 are made from cloth, cloth-like material, felt or the like but other materials could be used depending on whether the apparatus is used for washing, drying, polishing, waxing, etc. The cloth curtains 66 are provided with a plurality of spaced slits to form strips 68 which extend vertically as shown in FIG. 2.

After the pack units 48 have been inserted into the slots 52 of each rack 42, a removable end plate 70 (FIG. 1) is positioned over each end thereof and removably secured thereto by threaded bolts or other fastening means to prevent the longitudinal displacement of the pack units 48 relative to the rack 42.

The upper surface of each rack is provided at the ends thereof with an angle shaped mounting bracket 72. One flange of each bracket 72 is secured to the rack 42 by bolts while the other flange extends upwardly therefrom. One scrubbing unit 40 on each side of axis 38 is directly driven as will subsequently be described and is thus provided with an additional angle shaped mounting bracket 74 (FIG. 1).

Mounted on each of the side members 28 of frame 12 are three bearing assemblies or blocks 78 which are spaced apart along the length of member 28 as shown in FIG. 3. Each bearing assembly 78 has a corresponding bearing assembly 80 mounted on and spaced apart along the length of the intermediate member 30 of frame 12. Member 30 carries six bearing assemblies 80, three assemblies for the scrubbing units 40 in each bay A and B.

Each bearing assembly 78 is transversely aligned with a bearing assembly 80 as shown in FIGS. 1 and 3 and the corresponding bearing assemblies 78, 80 are connected by an elongated cross pipe, member or bar 84 which forms a pivot for the corresponding unit 40.

Each rack 42 is provided with a pair of upstanding rigid arms 86 which have their lower ends secured to the upstanding flanges on the mounting brackets 72. The upper end portion of each arm 86 of each rack 42 has a circular opening 88 through which the pivot rod 84 extends. The inner arm 86 on the rack of the driving unit 40 in each bay A and B has an integral extension 86′ (FIG. 1). In addition the rack 42 of the driving unit 40 in each bay A and B has a rigid drive arm 90 having a length equal to the length of arm 86 and extension 86′ as shown in FIG. 1. Arm 90 is secured on the lower end thereof to mounting bracket 74. The upper ends of the extension 86′ and arm 90 is provided with a support rod 92 extending and secured therebetween (FIG. 1).

The driving scrubbing unit 40 in each bay A and B having the extension 86′ and arm 90 is directly connected to the other two scrubbing units 40 by a pair of tie bars 94 (FIG. 1). Each bar 94 at one side of the bay A and B is pivotally connected to the corresponding arms 86 of the other two racks 42. Since there are three units 40, there are three arms connected by each tie bar 94. Tie bar 94 is pivotally connected at 96 on one end to the arm 86 of the driving unit 40 constituting the first unit of the set and on the other end to the arm 86 of the unit 40 constituting the third unit of the set. The second and intermediate unit 40 of each set has the corresponding tie bars 94 secured to the corresponding arms 86 by means of the pivotable cross member 98 (FIG. 1). With such a construction, when the driving unit 40 of each set is driven, the tie bars 94 swing the other two units 40 of each set simultaneously as will subsequently be explained in greater detail.

Power actuated means 100 are provided for swinging the units 40 of each set in a selected or predetermined phase relationship. The power actuated means 100 is mounted on and carried by the superstructure 22 of the frame 12 as shown in FIGS. 2 and 4. A support structure 101 is mounted on intermediate member 30 for elevating the power actuated means 100 above the units 40. The power actuated means 100 includes a single electrical or hydraulic motor 102 supported by bracket 104 (FIG. 1) of support structure 101. The motor 102 has a shaft coupled to the input shaft of a speed reducer or gear box 106 which is provided with suitable reduction gearing as is shown in the art. The gear box 106 has a double ended output shaft 108 which extends transversely of the axis 38, with one end of shaft 108 extending into each bay A and B. Mounted on each end of shaft 108 is a pitman arm or crank 110. One end of pitman arm 110 is secured to shaft 108 (FIG. 1) while the other end thereof is connected to one end of a drive or connecting rod 112. The other end of the connecting drive rod 112 is connected to support 92 of the driving unit 40 of each set.

The pitman arms 110 are located 90° to 180° out of phase with one another and each arm 110 is rotatable through a 360° arc or circle. In its rotation the pitman arm 110 will actuate the rod 112 resulting in the driving scrubbing unit 40 in each bay A and B swinging about rod 84 through an arcuate path backward and then forward while simultaneously imparting the same motion to the other two units of the set through the tie bars 94. With the present construction due to the phase relationship between the set of units 40 in each bay A and B, the units 40 of one set moves or swings in one direction while the units 40 of the other set moves or swings in the other direction. Each rack of each set moves through an arc of 105° between the forward and rearward limiting positions.

The frame 12 of FIGS. 2 and 4 is provided with a conduit 116 having a plurality of spray nozzles or apertures 118 therein for directing a spray of liquid such as water or a suitable cleaning agent toward the motor vehicle as it passes through the opening of the frame 12 for washing applications. The source of the liquid is not shown and any conventional source of liquid or cleaning solution will suffice. The conduit 116 extends around the top, sides and ends of the frame 112 as shown in FIGS. 2 and 4.

In operation, when the apparatus 10 is energized, the conveyor, not shown, moves the vehicle to be cleaned through the entrance 32 into and through the opening 36 to the exit 34. The water and cleaning agent is sprayed over the scrubbing units 40 in each bay A and B. The motor is energized to rapidly swing the units 40 of each set through an arc of 105° in a selected phase relationship. As shown, an out of phase relationship is employed in FIG. 1 as noted by the positions of arms 110. The racks are swung through an arcuate or circular path forward and then backward and as a result thereof imparts to the curtains 60 a sweeping scrubbing and flicking motion to permit the curtains 60 and strips 68 to contact the exposed exterior surfaces of the vehicle along the top, side, front and back as well as the bumpers and window wells to clean such surfaces. When the cycle has been complete the vehicle leaves the opening via exit 34. Due to the phase relationship previously described one set of units 40 moves in the direction of travel of the vehicle while the other set of units 40 moves in the opposite direction resulting or producing a balancing in the inertial and/or friction scrubbing forces.

The mechanism or apparatus 10 is easy to maintain since the pack units 48 when worn are easily replaceable by removing and installing end plates 70. Also the apparatus has long life and relatively free maintenance by utilizing rigid arms 86 and tie bars 94 for mechanically reproducing the swinging motions of the driving units 40 in bays A and B.

With this detailed description of the specific apparatus used to illustrate the prime embodiment of the present invention and the operation thereof, it will be obvious to those skilled in the art that various modifications can be made in the structure, apparatus, materials and usages recited herein without departing from the spirit and scope of the present invention which is limited only by the appended claims.

What is claimed is:

1. A friction curtain apparatus for washing or drying or finishing a motor vehicle comprising a frame having an opening provided with an entrance and an exit, said opening having a longitudinally extending axis between said entrance and exit, said opening being adapted to receive a vehicle for movement therethrough by relative motion between the aforesaid frame and the vehicle along a predetermined path between said entrance and exit, a pair of swingable scrubbing units pivotally carried by said frame and disposed in said opening and capable of turning in alternate directions forward and then backward with respect to said entrance and to said exit, each of said units being pivotable about a horizontal axis which is generally perpendicular to said longitudinally extending axis, one of said units being located on one side of said longitudinally extending axis and the other of said units being located on the other side of said longitudinally extending axis, each of said units comprising an elongated rack having a plurality of transversely extending elongated slot-defining apertures which are parallel to one another, said apertures having axes lying in a flat plane, a pack unit containing fill material received in each of said apertures and forming a curtain, each curtain being arranged on each rack in spaced apart, generally parallel relation relative to the other curtains, with each curtain extending generally perpendicular to said longitudinally extending axis and having an end portion which extends beyond a side of the vehicle, each curtain defining a row of closely arranged elongated flexible strips which hang freely when the units are beyond the ends of the vehicle and are substantially in continuous contact with the vehicle during the swinging movement of the rack when the units overlie the vehicle, power actuated means for swinging said racks and the curtains carried thereby through an arcuate path forward and then backward and imparting to said curtains a sweeping, scrubbing and flicking motion to permit said curtains to contact the exterior surfaces of the vehicle to finish the vehicle, said power actuated means including means for coordinating the swinging of said racks and said curtains in a predetermined phase relationship whereby the rack and curtains at one side of said longitudinally extending axis are out of phase with the rack and curtains on the other side of said longitudinally extending axis, each slot-defining aperture having a key-hole configuration, each aperture having a generally cylindrical inner portion opening downwardly through a restricted neck portion, each pack unit comprising a substantially solid, elongated, headforming and pack reinforcing support element made from a resiliently firm yet flexible plastic material, said support element including a generally cylindrical, solid, bulb-like portion having single, substantially flat, integral, solid fin portion of rectangular configuration extending from said bulb-like portion, a first sheet of generally flexible material having one portion looped tightly over said elongated support element so as to conform closely to the contours thereof and a second portion extending from the support element, said looped portion having a first section closely overlying said bulb-like portion and second and third sections integrally contiguous with the respective opposite ends of said first section tightly overlying corresponding opposite sides of said fin portion, fastening means for securing the looped portion to said first sheet to said elongated support element to prevent relative sliding movement therebetween and forming a generally cylindrical, flexible material covered bulbous head and neck portion of the pack unit which is telescopically received in the corresponding aperture for replaceably mounting said pack unit thereto, said fill material forming said curtain having an inner portion secured to the second portion of said first sheet and an outer portion engageable with the vehicle.

2. The apparatus of claim 1 wherein there are a pair of swingable scrubbing units at each side of said longitudinally extending axis which are pivotally carried by said frame, with each pair of units at each side of said longitudinally extending axis being pivotally connected by a pair of tie bars to permit same to swing in unison forward and then backward.

3. The apparatus of claim 2 wherein each rack of each pair of swingable scrubbing units has a pair of upstanding rigid pivot arms connected on the lower ends thereof to opposite end portions of the rack, with the upper end portions of the arms of each rack having openings for receiving a rod which is pivotally carried by said frame and about which the corresponding unit pivots.

4. The apparatus of claim 1 wherein there are three swingable scrubbing units at each side of said longitudinally extending axis which are pivotally carried by said frame, with said three units at each side of said longitudinally extending axis being pivotally connected by a pair of tie bars to permit same to swing in unison forward and then backward.

5. The apparatus of claim 4 wherein each rack of the three scrubbing units has a pair of upstanding rigid pivot arms connected on the lower ends thereof to opposite end portions of the rack, with the upper end portions of the arms of each rack having openings for receiving a rod which is pivotally carried by said frame and about which the corresponding unit pivots.

6. The apparatus of claim 1 wherein each rack has a pair of upstanding rigid pivot arms connected on the lower ends thereof to opposite end portions of the rack, with the upper end portions of the arms of each rack having openings for receiving a rod which is pivotally carried by said frame and about which the unit pivots.

7. The apparatus of claim 6 wherein said power actuated means include a drive shaft, crank arms mounted on the ends of said drive shaft, and a pair of connecting rods, said rods each being secured on one end to one of the crank arms and on the other end to one of the arms of the rack for swinging same.

8. a friction curtain apparatus for washing or drying or finishing a motor vehicle comprising a frame having an opening provided with an entrance and an exit, said opening having a longitudinally extending axis between said entrance and exit, said opening being adapted to receive a vehicle for movement therethrough by relative motion between the aforesaid frame and the vehicle along a predetermined path between said entrance and exit, a pair of swingable scrubbing units at each side of said longitudinally extending axis, said units at each side of said axis being pivotally carried by said frame and disposed in said opening and capable of turning in alternate directions forward and then backward with respect to said entrance and to said exit, each of said units being pivotable about a horizontal axis which is generally perpendicular to said longitudinally extending axis, each of said units comprising an elongated rack having a plurality of transversely extending elongated slot-defining apertures which are parallel to one another, said apertures having axes lying in a flat plane, a pack unit containing fill material received in each of said apertures and forming a curtain, each curtain being arranged on each rack in spaced apart, generally parallel relation relative to the other curtains, with each curtain extending generally perpendicular to said longitudinally extending axis and having an end portion which extends beyond a side of the vehicle, each curtain defining a row of closely arranged elongated flexible strips which hang freely when the units are beyond the ends of the vehicle and are substantially in continuous contact with the vehicle during the swinging movement of the rack when the units overlie the vehicle, power actuated means for swinging said racks and the curtains carried thereby through an arcuate path forward and then backward and imparting to said curtains a sweeping, scrubbing and flicking motion to permit said curtains to contact the exterior surfaces of the vehicle to finish the vehicle, said power actuated means including means for coordinating the swinging of said racks and said curtains in a predetermined phase relationship whereby the racks and curtains at one side of said longitudinally extending axis are out of phase with the racks and curtains on the other side of said longitudinally extending axis, and each rack of each unit having a pair of upstanding rigid pivot arms connected on the lower ends thereof to opposite end portions of the rack, with the upper end portions of the arms of each rack having openings for receiving a rod which is pivotally carried by said frame, with each pair of units at each side of said longitudinally extending axis being pivotally connected by a pair of tie bars which are pivotally secured to said arms on said racks to permit same to swing in unison forward and then backward.

9. The apparatus of claim 8 wherein said power actuated means includes a drive shaft, crank arms mounted on the ends of said drive shaft, and a pair of connecting rods, one rod for each pair of swingable scrubbing units at each side of said longitudinally extending axis, said rods each being secured on one end to one of the crank arms and on the other end to one of the arms of a rack of a pair of scrubbing units for swinging said units.

10. The apparatus of claim 9 wherein one rack of each pair of scrubbing units is provided with an additional arm cooperating with said one of the arms of a rack to which said rod is connected, there being a support between said additional arm and said one arm upon which said other end of the rod is mounted.

11. A friction curtain apparatus for washing or drying or finishing a motor vehicle comprising a frame having an opening provided with an entrance and an exit, said opening having a longitudinally extending axis between said entrance and exit, said opening being adapted to receive a vehicle for movement therethrough by relative motion between the aforesaid frame and the vehicle along a predetermined path between said entrance and exit, three swingable scrubbing units at each side of said longitudinally extending axis, said units at each side of said axis being pivotally carried by said frame and disposed in said opening and capable of turning in alternate directions forward and then backward with respect to said entrance and to said exit, each of said units being pivotable about a horizontal axis which is generally perpendicular to said longitudinally extending axis, each of said units comprising an elongated rack having a plurality of transversely extending elongated slot-defining apertures which are parallel to one another, said apertures having axes lying in a flat plane, a pack unit containing fill material received in each of said apertures and forming a curtain, each curtain being arranged on each rack in spaced apart, generally parallel relation relative to the other curtains, with each curtain extending generally perpendicular to said longitudinally extending axis and having an end portion which extends beyond a side of the vehicle, each curtain defining a row of closely arranged elongated flexible strips which hang freely when the units are beyond the ends of the vehicle and are substantially in continuous contact with the vehicle during the swinging movement of the rack when the units overlie the vehicle, power actuated means for swinging said racks and the curtains carried thereby through an arcuate path forward and then backward and imparting to said curtains a sweeping, scrubbing and flicking motion to permit said curtains to contact the exterior surfaces of the vehicle to finish the vehicle, said power actuated means including means for coordinating the swinging of said racks and said curtains in a predetermined phase relationship whereby the racks and curtains at one side of said longitudinally extending axis are out of phase with the racks and curtains on the other side of said longitudinally extending axis, and each rack of each unit having a pair of upstanding rigid pivot arms connected on the lower ends thereof to opposite end portions of the rack, with the upper end portions of the arms of each rack having openings for receiving a rod which is pivotally carried by said frame, with each of the three units at each side of said longitudinally extending axis being pivotally connected by a pair of tie bars which are pivotally secured to said arms on said racks to permit same to swing in unison forward and then backward.

12. The apparatus of claim 11 wherein said power actuated means includes a drive shaft, crank arms mounted on the ends of said drive shaft, and a pair of connecting rods, one rod for each of the three swingable scrubbing units at each side of said longitudinally extending axis, said rods each being secured on one end to one of the crank arms and on the other end to one of the arms of a rack of the three scrubbing units for swinging said units.

13. The apparatus of claim 12 wherein one rack of each of the three scrubbing units is provided with an additional arm cooperating with said one of the arms of the rack to which said rod is connected, there being a support between said additional arm and said one arm upon which said other end of the rod is mounted.

* * * * *